(No Model.) 4 Sheets—Sheet 1.
E. B. MEATYARD.
COMBINED CAR BRAKE AND COUPLER.
No. 293,264. Patented Feb. 12, 1884.
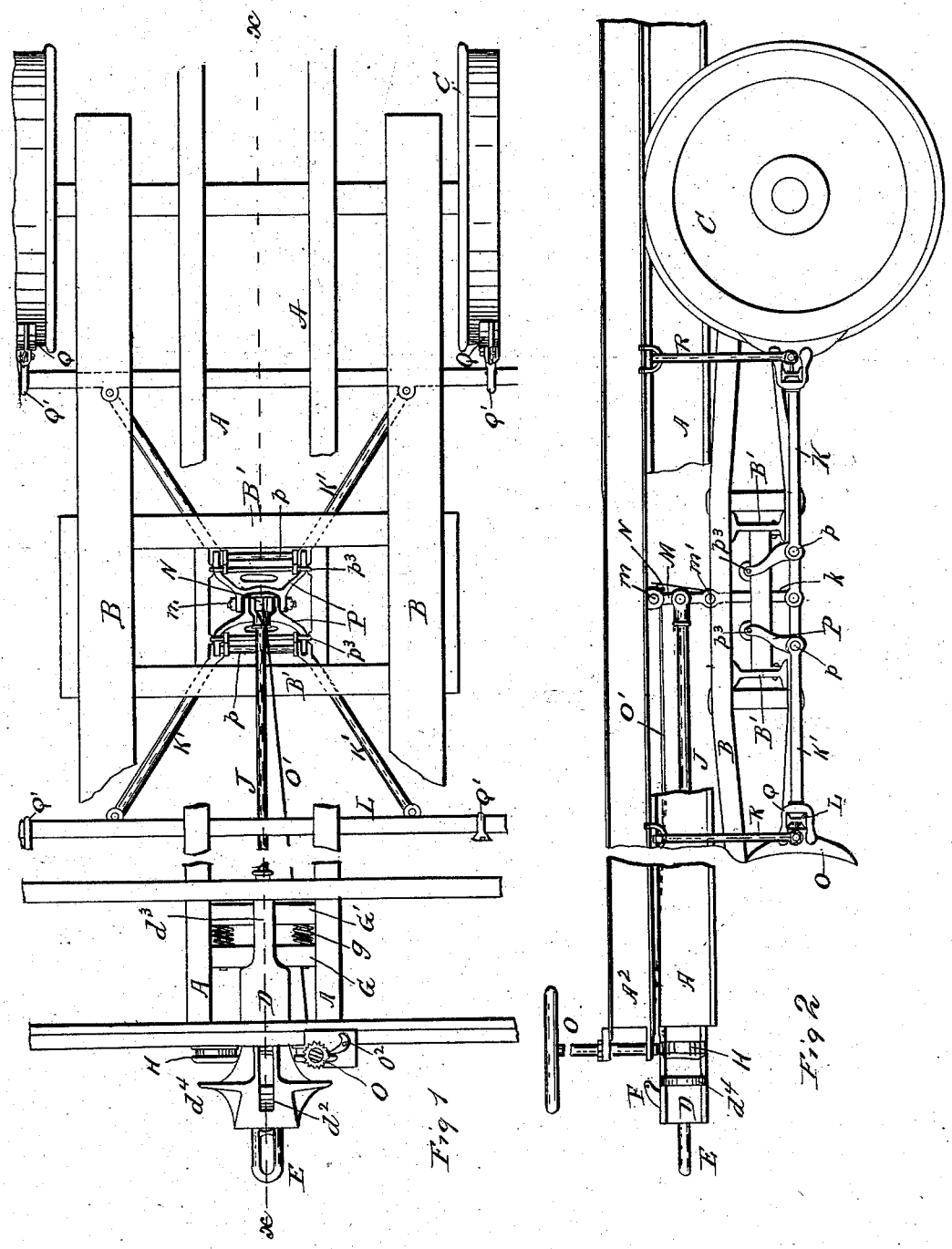
Witnesses
W. C. Corlies
A. M. Best
Inventor
Edward B. Meatyard
By Osburn & Thacher
Attorneys

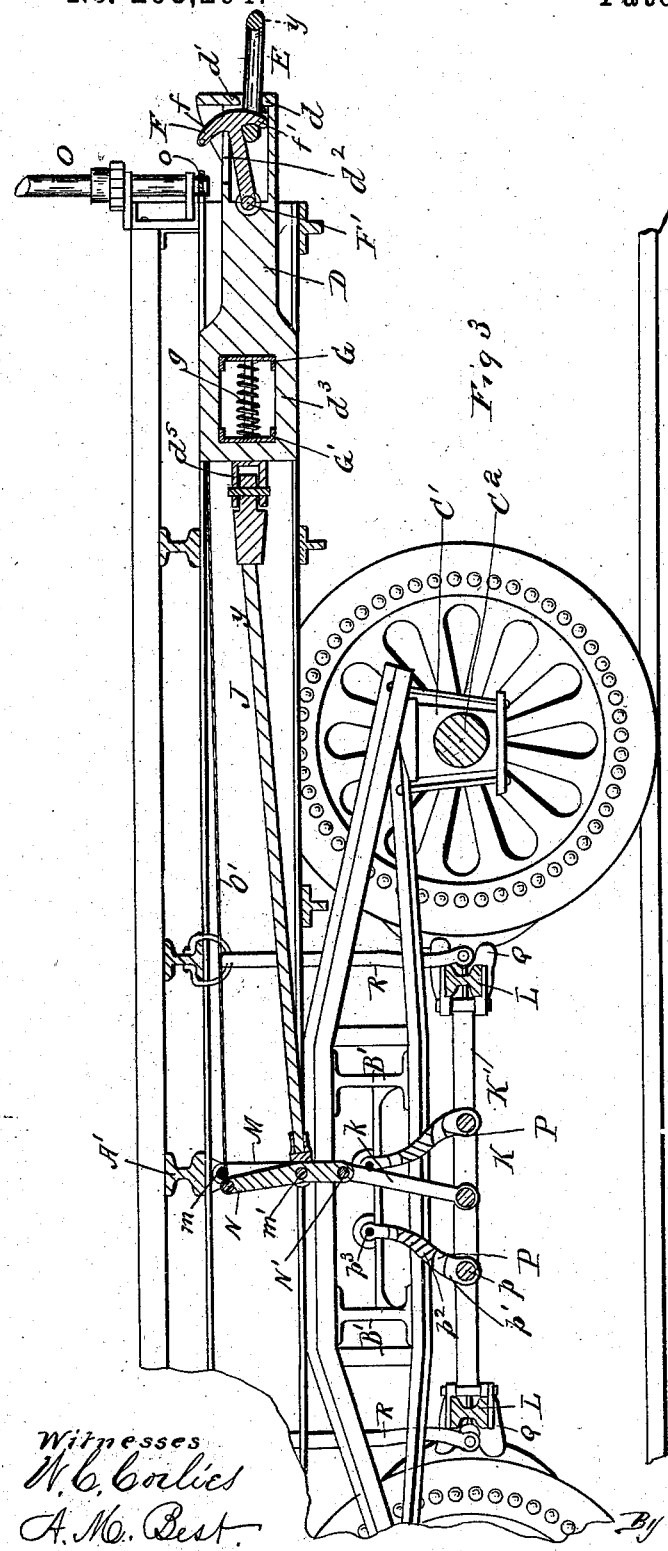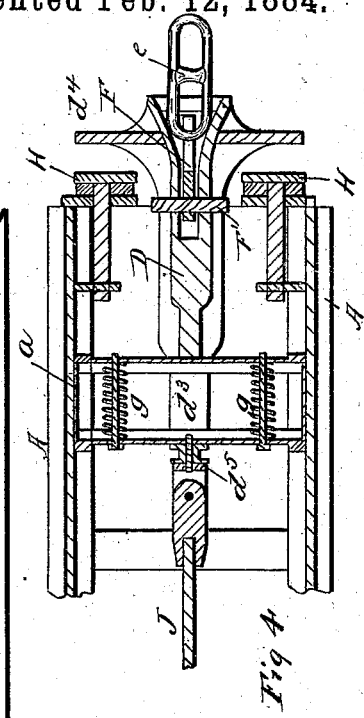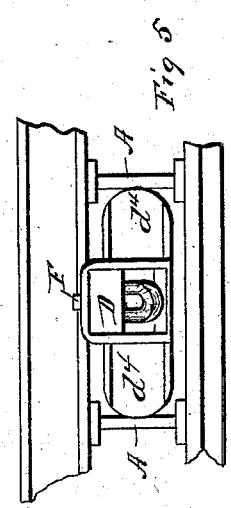

(No Model.) 4 Sheets—Sheet 3.
E. B. MEATYARD.
COMBINED CAR BRAKE AND COUPLER.
No. 293,264. Patented Feb. 12, 1884.
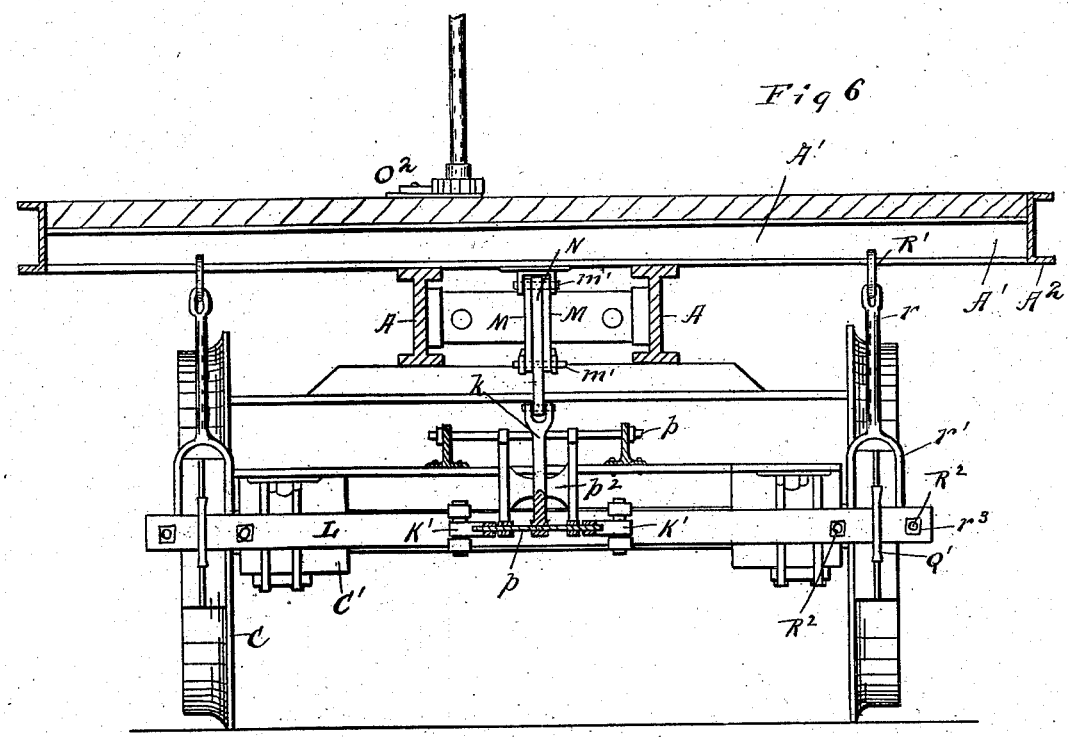
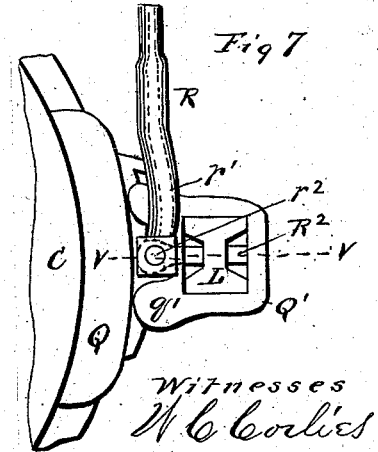
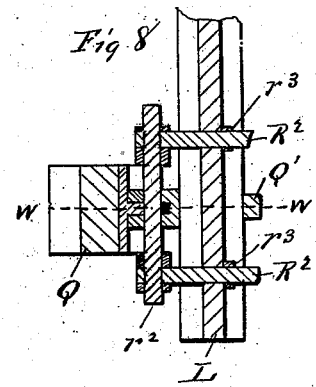
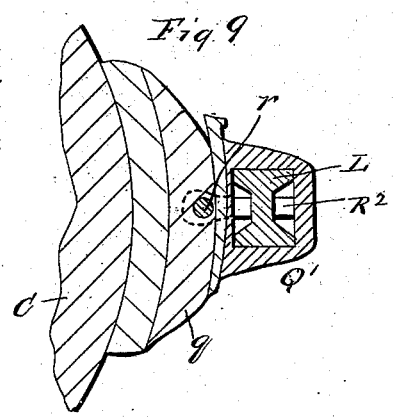
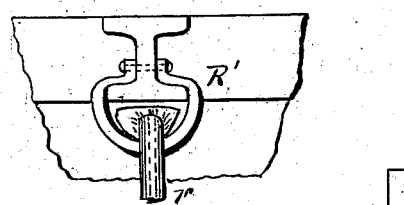
Witnesses
W. C. Corlies
A. M. Best
Inventor
Edward B. Meatyard
By Osburn & Thacher
Attorneys

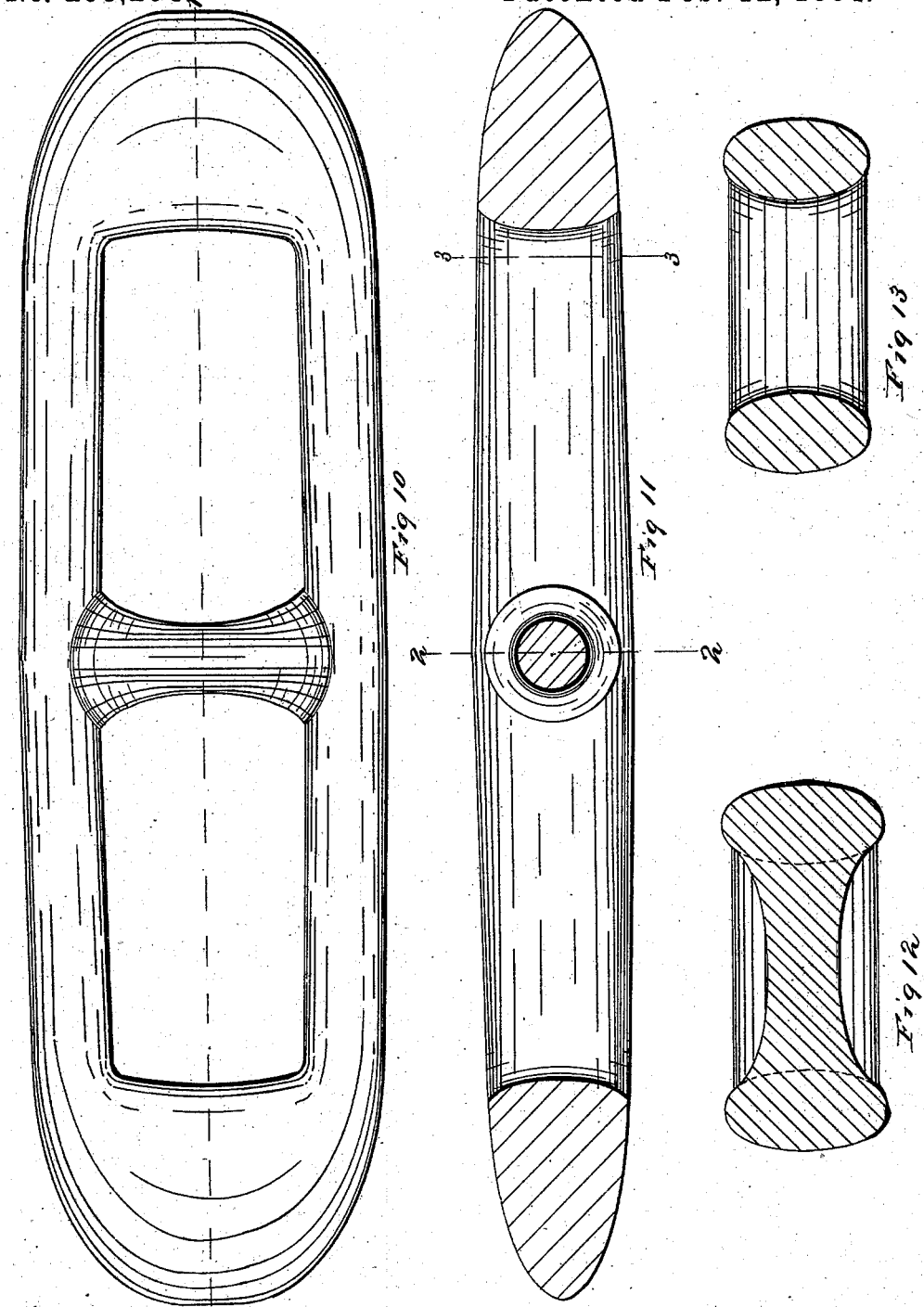

UNITED STATES PATENT OFFICE.

EDWARD B. MEATYARD, OF LAKE GENEVA, WISCONSIN.

COMBINED CAR BRAKE AND COUPLER.

SPECIFICATION forming part of Letters Patent No. 293,264, dated February 12, 1884.

Application filed May 7, 1883. (No model.)

*To all whom it may concern:*

Be it known that I, EDWARD B. MEATYARD, a citizen of the United States, residing at Lake Geneva, in the county of Walworth, in the State of Wisconsin, have invented certain new and useful Improvements in Combined Brakes and Couplers for Railway-Cars, which are fully set forth in the following specification, reference being had to the accompanying drawings, in which—

Figure 1 is a plan view of my improved coupler and brake mechanism. Fig. 2 is a side elevation of the same. Fig. 3 is an enlarged section on the line $x\,x$ in Fig. 1, the inner end of the truck being broken away. Fig. 4 is a detailed section on the line $y\,y$ in Fig. 3. Fig. 5 is a detailed and enlarged front elevation of the coupler. Fig. 6 is a cross-section. Fig. 7 is a detailed and enlarged side elevation of a brake-shoe and brake-hanger. Fig. 8 is a section on the line $v\,v$ in Fig. 7. Fig. 9 is a section on the line $w\,w$ in Fig. 8. Fig. 10 is an enlarged plan view of the coupling-link. Fig. 11 is a section on the line 1 1 in Fig. 10. Fig. 12 is a section on the line 2 2 in Fig. 11. Fig. 13 is a section on the line 3 3 in Fig. 11.

The same letters denote to the same parts in all the figures.

My invention relates to the brake mechanism of a railway-car and to a coupler automatically operating it. The object of it is to promote simplicity and strength in the construction and facility, certainty and efficacy in the operation of these elements.

To this end it consists in the several devices and combinations of devices which will be fully set forth hereinafter, and definitely pointed out in the claims.

Heretofore traction-brakes have failed because coupler-springs have been too strong to give the longitudinal play requisite, except in the case where they have had to stand the whole resistance of a heavy train. Springs strong enough to stand the resistance of one car adjusted in spring-plates strong enough to stand the towage of a heavy train will be ample for coupling strains; but the buffing strains must be taken on the ends of the draft-timbers before the traction-springs or their plates are overtaxed.

In the drawings, A denotes the longitudinal beams, and A' the joists of the car-floor. The floor is bordered with channel-bars A². B denotes the side beams, and B' the cross-beams, of the truck; C, the wheels, C' the axle-boxes, and C² the axles. I have elsewhere fully described and claimed all of these so far as they present any peculiarities, and none of them form any part of the present invention, which I will now proceed to describe.

I form the draw-bar and buffer in a single casting, D, which is arranged at the end of the car between the longitudinal floor-beams. Its outer parts are tubular for the purpose of containing the coupler. Just at the outer end it is considerably thickened at the top and bottom, the former in consequence of rising considerably above the rest of the casting, while at the sides it grows thinner, so as to present a broad mouth with flaring sides, but of only sufficient height to allow the coupling-link E to oscillate in it. The lower lip, D, of this mouth curves forward and downward in front, but its upper surface is flat, or nearly so, so as to afford a level seat for the link, which, however, as has already been stated, has room to play upward and downward on occasion. The upper lip, $d'$, is convex on its lower surface. A longitudinal slot, $d^2$, in the upper wall of the tubular part of the draw-bar allows the coupler F to play up and down in it. The coupler is anchor-shaped, but without flukes. The upper end of its shank is vertically pivoted on a pin or bolt, F', which is set in the sides of the tubular part of the draw-bar, near its inner end, and below the level of a horizontal plane equally dividing the link. The upper arm, $f$, projects upward through the slot $d^2$, so as to afford a convenient handle for lifting the coupler, for the purpose of attaching or detaching the link. The arms are made of such weight that unless the coupler is thus lifted the lower one, $f'$, will always rest on the bottom of the tube. When this arm becomes worn, the coupler can be readily detached and the lower side turned uppermost.

The link E, whose length is three or four times its breadth, is of generally elliptical outline, but curving much more rapidly at the ends than on the sides. Its thickness at the ends is about three times as great as in the sides, in order to meet the increased wear and strain which comes upon it there, so that its interior outline varies little from a rectangle, as shown in Fig. 10 of the drawings. Its cross-section at each end, as shown in Fig. 11, is substantially an oval with the larger end, which is inward, cut off by an inwardly salient curve of slow variation, corresponding to the curvature of the arms of the coupler F. I thus secure adaptation to the coupler and at the same time sufficient thickness to withstand end thrusts and strains. Elsewhere the link is elliptical in cross-section, the longer diameter being at right angles to the length of the link, as shown in Fig. 13. This conformation combines sufficient thickness with narrowness, and consequent room for lateral play, without undue widening of the seat in the buffer. It also meets the principal strain, which in this part of the link is generally vertical, whereas at the ends it is longitudinal and horizontal. The link is also subject to torsional and laterally compressive strains, and to meet these I provide a bridge, $e$, (shown in Figs. 10 and 12,) to brace it from side to side in the middle. I form the entire link in a single casting, preferably of soft steel and under pressure. The coupler is also preferably of steel cast under pressure.

Behind the point where the coupler is pivoted the draw-bar takes the form of an I-beam with its flanges arranged horizontally. At its rear end it is enlarged vertically and cut away in the middle, so as to form a hollow frame, $d^3$, for a pair of transverse channel-bars, G and G', with their hollows facing each other. The ends of these bars rest in guides $a$, which are set in the opposite faces of the webs of the longitudinal floor-beams A. The bars G and G' are not fastened either to the draw-bar or the guides, and are held as far apart as the frame and guides will allow by a pair of coiled springs, $g$, one at each end of the pair of bars. A single spring in an intermediate position would serve the same purpose; but the pair arranged as I have described them are more secure against lateral deflection. These springs should be of the first quality, and capable each of resisting a pressure of about from one hundred to two hundred pounds without compression, so that they may yield readily to the resistance of the car to traction. There should ordinarily be a clear space of about three inches between the two bars—$i.$ $e.$, between the edges of their flanges—when they are farthest apart. Any movement of the draw-bar inward—such as would be caused by the backing of the train—necessarily pushes the outer bar, G, toward the inner one, G', while an outward movement—such as would be caused by the starting of the train—pushes the inner bar toward the outer one, in either case compressing the springs. The elasticity of the springs, therefore, when not overcome by a push or pull of superior force, holds the draw-bar in an intermediate position.

Cushions H, preferably of india-rubber or other non-metallic material, are arranged in suitable supports at the ends of the longitudinal beams A, to take the thrust of the buffer, which is provided with laterally-projecting wings $d^4$, which come in contact with the cushions whenever the draw-bar is thrust in. These wings may be provided with cushions additional to or instead of those at the ends of the beams. By this device I am enabled to do away with all slack and consequent uncertainty of operation in the draw-bar.

Behind the frame $d^3$, and on its inner end, the draw-bar carries a clevis, $d^5$, in which is horizontally pivoted the enlarged forward end of a rod, J, which connects the draw-bar with the brake mechanism.

The bars G and G' constitute the support of the draw-bar and limit its backward and forward motion.

The brake-bars L are operated by a toggle, K, each member of which spreads laterally into two branches, as shown in my application No. 66,107, filed July 7, 1882. Each branch is connected by a bar, K', (for which stiff pipe may be substituted,) with the nearer end of the corresponding brake-bar. The lifting of the knee $k$ of the toggle, drawing the ends of the arms, and consequently the brake-bars, toward each other, takes off the brakes. The depression of the knee, on the contrary, pushes each brake-bar away from the other and toward the corresponding wheels, and thus putting the brakes on. The mechanism by which the knee is elevated or depressed, and the connections of the toggle with the brake-bars, differ materially from anything shown in the application referred to.

On the middle of the lower side of one of the floor-joists A' is vertically pivoted a hanger, M, composed of two parallel bars joined at their upper and lower ends, respectively, by horizontal pins $m$ and $m'$, the former having bearings in brackets which are fixed to the joist. The space between the two vertical bars of the hanger is just sufficient to admit of pivoting on the lower horizontal pin, $m'$, a bar, N, which extends downward a little way below its pivot, and upward so far that its upper end, when drawn forward, comes in contact with the upper horizontal pin, $m$. The hanger M extends downward about one-third of the distance from the joist A' to the lowest position of the knee of the toggle. The bar N is bent, so that the part above its pivot $m$ inclines slightly away from the outer end of the truck, so that when the part below the pivot is upright the upper end may lock against the pin $m$ on the side farthest from the coupling mechanism. A connecting bar or rod, N', is pivoted to the lower end of the bar N, and to the knee $k$ of the toggle, and is long enough to allow the knee to drop to a level with the ends of the arms when the lower end of the bar N is in its lowest position. A chain or wire rope, O', is attached to the bar N, near its upper end, and extends to the outer end of the truck, where it is wound around the drum o of the hand-wheel O, the drum being provided with teeth, in which a pawl, $O^2$, engages in the usual manner, so as to prevent unwinding of the chain. By winding up the chain on the drum o, so that the upper end of the bar N is drawn against the pin m, the bar N is provided with a fixed fulcrum virtually identical with the bearings of the pin m, so that its oscillation on this fulcrum either backward or forward will shorten the distance between the fulcrum and the knee k of the toggle, and will consequently lift the latter and take off the brakes. This oscillation is effected by means of the rod J, which I have already described as pivoted at one end to the inner end of the draw-bar, and which is pivoted at the other on the lower horizontal pin, m', of the the hanger M, on which pin the bar N is also pivoted to the hanger. The length of the rod J is equal to the distance between the pin m' and the inner end of the draw-bar when the hanger M is perpendicular and the channel G and G', which pass transversely through the draw-bar, are held by the springs g in their position of greatest separation. In this position of the hanger, (provided the bar N is virtually identified with it by winding up the brake-chain O', as already described,) the knee k of the toggle will be in its lowest position, and the brakes will consequently be on, and the corresponding position of the draw-bar will be secured by the elasticity of the springs so long as that elasticity is not overcome by any push or pull on the draw-bar sufficient to compress them. Any such push or pull causing the inner end of the draw-bar to move inward or outward will necessitate, by reason of the stiffness of the rod J, a corresponding inward or outward movement of the pin m', and consequently of the lower end of the bar N and of the connecting-bar N', either movement necessarily raising the knee k of the toggle and taking off the brakes. Obviously, either the starting or backing of the train will thus of itself take off the brakes, which will of themselves be on at all other times.

By means of the pivoting of the bar N to the lower pin, m', of the hanger M, and its attachment to the brake-chain O', I make the operation of the draw-bar and its springs upon the brake mechanism so dependent on the hand-wheel O that on a detached car the brakes may be operated by means of it. Thus they may be loosened by unwinding the chain and thereby allowing the bar N to oscillate on the pin m', so that the connection of the rod J with that pin will have no effect on the bar, and consequently none on the brakes, which will thus have nothing to hold them to the wheels. On the other hand, by winding up the chain, and thus making the bar N virtually rigid upon the pin m', it will be held vertical by the elasticity of the draw-bar springs g, and the wheels will thus be braked. As I think it preferable on the whole not to connect the brake mechanism of either truck with that of the other, this use of the hand-lever will always be requisite for the rear truck of the rear car of a train, which is not at all objectionable, inasmuch as, for other reasons, a brakeman should always be stationed at the rear of every train.

The connection of the toggle K with the connecting-bars K', through which it acts on the brake-bars, is through a pair of hangers, P, in which the inner ends, k', of the connecting-bars and the outer ends, $k^2$, of the branches of the toggle are jointly hinged, the end k' of each connecting-bar being divided, and the corresponding ends $k^2$ of the toggle-branch being inserted in the groove thus formed. Each of these hangers consists of a horizontal bar, p, rather longer than the greatest distance between the branches of the toggle, and of two vertical bars, p', rigidly attached to the horizontal bar and connected with each other by a web, $p^2$. Each of the bars p' is pivoted at its upper end, so as to oscillate lengthwise of the truck on a rigid horizontal bar, $p^3$, parallel with the bar p, and rest in supports arranged in the cross-beams B' of the truck. The pivoting of the hanger on the bar $p^3$ is loose enough to allow of a slight play laterally sufficient to follow the varying positions of the truck in rounding curves, &c., but not enough to impair the correspondence of the brakes with the wheels. The bars $p^3$ of the two hangers are arranged a little distance in front and rear, respectively, of the knee of the toggle, so as to give in all positions of the toggle a nearly vertical support to it and to the connecting-bars K'. By this means both toggle and brake-bars are kept level and firm. Brake-bars as ordinarily arranged are continually rocking back and forth to a greater or less extent, and this bringing one end of the brake-shoe in contact with the tread of the wheel when the brakes are not on, which contact, when the wheel is revolving rapidly, causes a mischievous wear of the tire. By attaching a pair of the connecting-bars K' rigidly to each brake-bar the latter is kept steady and virtually level, inasmuch as the connecting-bars are maintained virtually level at all times by the toggle-hangers P, which, as has been stated, are hung in such a position as to be always nearly vertical, and in every position are kept steady by the operation of the draw-bar on the toggle.

I find channel or I-beam iron fittest for the brake-bars, which need great strength vertically, but when braced by the connecting-bars K' not so much laterally.

Each brake-shoe Q is formed by T-iron, the rib or stem q of the T being on the side away from the wheel. The brake-head Q' has a groove corresponding to this rib in position and curvature, and fitting the rib easily enough to allow of a slight rocking motion of the shoe in its seat, so that it may adjust itself exactly to the tread of the wheel. Each brake-shoe is suspended directly from the flooring of the car by a hanger, R, whose upper end, r, is formed into a loop, which is supported in a staple or clevis, R', so as to have free motion in every direction. At its lower end it takes the form of a clevis, r', whose height is about half that of the brake-shoe, and whose breadth is about the same as that of the face of the shoe. Its connecting-pin $r^2$ passes through the rib $q$ of the shoe, the sides of the groove in the brake-head being cut away so as to admit of this, and projects on either side beyond the sides of the clevis. An eyebolt, $R^2$, fits on each of the projecting ends, and passes through the web of the brake-bar L, and is secured on the other side of the web by a nut, $r^3$. An enlargement on one end of the clevis-pin $r^2$, and a nut, $r^4$, on the other end, complete the fastening of the hanger to the bar and shoe. The hanger is bent slightly from a perpendicular, so that the clevis $r'$ is parallel, or nearly so, with the curvature of the brake-shoe. By the construction which I have described I bring the support of the brake-shoe close to the wheel, and thus hold the face of the shoe parallel with the tread of the wheel. I thus avoid that uneven and biting action of the shoe on the wheel which is observed when the hangers are attached not to the shoes directly but to the brake-bars, a considerable distance back from the faces of the shoes. When the face of the shoe becomes worn, a wedge can be inserted in the groove of the brake-head behind the rib $q$ of the shoe, which will thus be forced forward into its proper position. This insertion can readily be made by loosening the eyebolts $R^2$, which hold the brake-bar and brake-head against the shoe. The brake-head Q' fits on the brake-bar by means of a loop, $q'$, formed at its back, and is held against lateral motion by an enlargement of the lower end of each side of the clevis $r'$, where the connecting-pin $r^2$ passes through. Since the brake-head is without any direct fastening to either shoe or brake-bar, their relative positions can readily be adjusted as described.

What I claim as my invention, and desire to secure by Letters Patent, is—

1. A draw-bar, in combination with a brake-bar, a system of levers connecting the draw-bar to the brake-bar, and springs arranged in the usual gap at the rear end of the draw-bar, adapted and adjusted to maintain the said draw-bar in a normal position intermediate between the extremes of its range, and at the same time in this position to keep the brakes set up, and also adapted and adjusted to yield nearly the whole of their elastic range under a pull or thrust of traction due to the resistance of a single moving car, to thereby take off the brakes, substantially as described.

2. The buffer provided with laterally-projecting wings, in combination with traction-springs, to keep slack between said wings and the end of the car, and auxiliary springs filling part of the slack to meet excessive buffing-shock as the traction-springs are compressed, and mechanism connecting the rear of the draw-bar with the brake.

3. The toggle K, arranged substantially as described, the hanger M, suspended above the knee of the toggle, so as to admit of oscillation lengthwise of the car, the bar N, vertically pivoted at the lower end of the hanger, extending a little way below the pivot, and having the part above the pivot equal in length to the hanger and bent slightly toward the inner end of the truck, the chain $O^2$, connecting the upper end of the bar with the hand-wheel, means for communicating the motion of the draw-bar to the lower end of the hanger, and means for communicating to the knee of the toggle the upward and downward motion of the lower end of the bar, all in combination, substantially as and for the purpose described.

4. The brake-bar L, in combination with two stiff connecting-bars, K', to which the brake-bar is readily fastened, and which converge near the center of the truck, and are there attached to an independent and substantially level support, whereby the brake-bar is held from rocking and the brake-shoes prevented from rubbing the wheels, substantially as and for the purposes set forth.

5. The two toggle-hangers P, the toggle K, and the connecting-bars K', all constructed and arranged substantially as and for the purpose described.

EDWARD B. MEATYARD.

Witnesses:
THOMAS H. PEASE,
RASMUS DAY.